United States Patent
Flückiger

(10) Patent No.: US 9,334,888 B2
(45) Date of Patent: May 10, 2016

(54) FASTENING DEVICE

(76) Inventor: Werner Flückiger, Oberkulm (CH)

( * ) Notice: Subject to any disclaimer, the term of this patent is extended or adjusted under 35 U.S.C. 154(b) by 211 days.

(21) Appl. No.: 13/121,540

(22) PCT Filed: Sep. 30, 2009

(86) PCT No.: PCT/EP2009/007024
§ 371 (c)(1),
(2), (4) Date: Jun. 7, 2011

(87) PCT Pub. No.: WO2010/037535
PCT Pub. Date: Apr. 8, 2010

(65) Prior Publication Data
US 2011/0229285 A1    Sep. 22, 2011

(30) Foreign Application Priority Data

Sep. 30, 2008  (DE) .......................... 10 2008 049 640
Dec. 31, 2008  (WO) ................. PCT/EP2008/011157

(51) Int. Cl.
*F16B 35/02*    (2006.01)
*F16B 5/02*     (2006.01)
*F16B 33/00*    (2006.01)

(52) U.S. Cl.
CPC ............. *F16B 5/0283* (2013.01); *F16B 33/002* (2013.01)

(58) Field of Classification Search
CPC ........ F16B 5/0283; F16B 5/02; F16B 33/002; F16B 33/06; F16B 35/00; F16B 35/041; F16B 35/06; F16B 35/04
USPC .............. 411/387.2, 399, 383, 384, 103, 107, 411/337, 396, 367, 387.5
See application file for complete search history.

(56) References Cited

U.S. PATENT DOCUMENTS

| | | | |
|---|---|---|---|
| 2,982,166 A * | 5/1961 | Hobbs ........................... | 411/399 |
| 3,096,678 A * | 7/1963 | Devine et al. ................... | 411/64 |
| 3,667,338 A * | 6/1972 | Johansson ...................... | 411/378 |
| 3,916,757 A * | 11/1975 | Wilson .......................... | 411/386 |
| 4,161,132 A * | 7/1979 | Eklund et al. ................. | 411/417 |
| 4,295,765 A * | 10/1981 | Burke ........................... | 410/101 |
| 4,439,077 A * | 3/1984 | Godsted ........................ | 411/411 |
| 4,486,134 A | 12/1984 | White | |

(Continued)

FOREIGN PATENT DOCUMENTS

| | | |
|---|---|---|
| EP | 0 476 466 | 3/1992 |
| EP | 0 870 118 | 10/1998 |
| EP | 1 184 577 | 6/2002 |

*Primary Examiner* — Gary Estremsky
(74) *Attorney, Agent, or Firm* — Dickinson Wright PLLC

(57) ABSTRACT

A fastening device includes a screw (1,21) with a thread part (2) and a shaft part (3,23), the shaft part (3,23) having a recess (4) at the free end for the insertion of a tool, and a sleeve (6,26) with an external thread (7) and an enlarged rim portion (8), which has means for the placement of a second tool. The screw (1,21) is formed by a rod-shaped screw blank made of hardenable steel, which has an enlarged head portion (5) at one end. The sleeve (6,26) can be mounted onto the screw blank from the other end and has a step, which can be placed on or against the head portion (5). The shaft part (3,23) is designed with a support section (16,22) for the pushed on sleeve (6,26) and the support section (16,22) can be generated by deforming the screw blank so as to hold the sleeve (6,26) on the shaft part (3,23) in such a manner that the screw (1,21) and/or the sleeve (6,26) can be rotated. The fastening device, is suitable for being screwed directly into massive materials, e.g. concrete, brick, metal and the like.

23 Claims, 4 Drawing Sheets

(56) References Cited

U.S. PATENT DOCUMENTS

| | | | |
|---|---|---|---|
| 4,655,656 A * | 4/1987 | Jonsson | 411/337 |
| 4,655,661 A * | 4/1987 | Brandt | 411/387.1 |
| 4,842,467 A * | 6/1989 | Armstrong | 411/399 |
| 5,234,300 A * | 8/1993 | Fluckiger | 411/383 |
| 5,531,554 A * | 7/1996 | Jeanson et al. | 411/399 |
| 5,683,217 A * | 11/1997 | Walther et al. | 411/399 |
| 6,050,765 A * | 4/2000 | McGovern et al. | 411/387.2 |
| 6,086,303 A * | 7/2000 | Fluckiger | 411/399 |
| 6,106,208 A * | 8/2000 | Lin | 411/418 |
| 6,386,810 B1 * | 5/2002 | Onoe | 411/411 |
| 2003/0017028 A1 * | 1/2003 | Chu et al. | 411/387.2 |
| 2007/0292235 A1 * | 12/2007 | Shinjo | 411/386 |

* cited by examiner

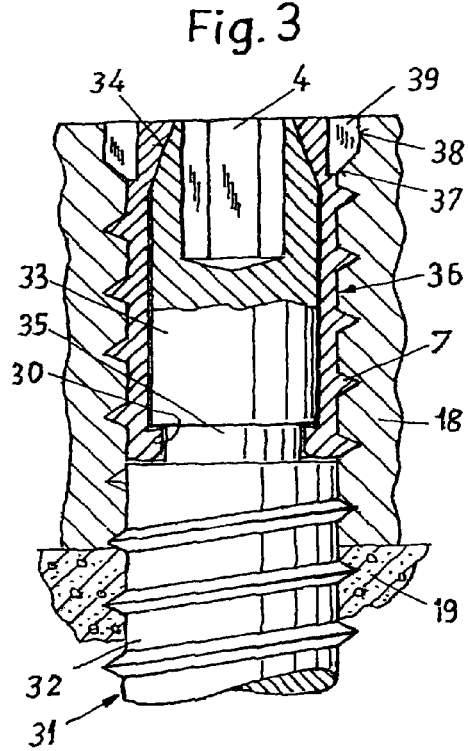
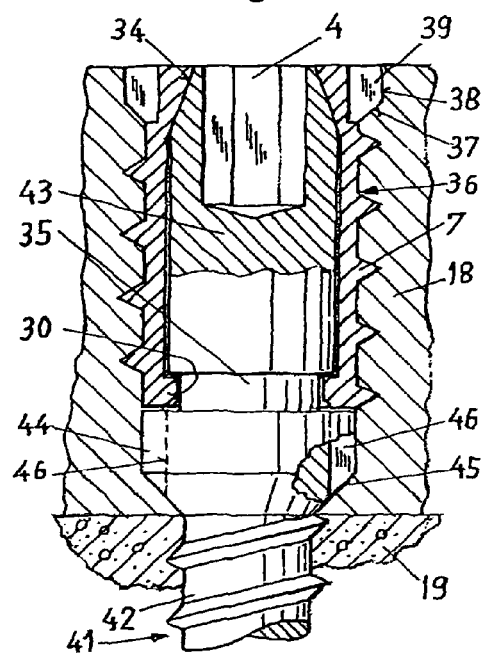

FASTENING DEVICE

CROSS-REFERENCE TO RELATED APPLICATIONS

This application is a 371 U.S. National Stage of International Application No. PCT/EP2009/007024, filed Sep. 30, 2009. This application claims the benefit of German Patent Application No. DE 10 2008 049 640.5, filed Sep. 30, 2008 and European PCT application PCT/EP2008/011157, filed Dec. 31, 2008. The entire disclosures of the above applications are incorporated herein by reference.

The invention relates to a fastening device for anchorages in massive bases or materials, e.g. concrete, brick, steel or the like, consisting of a screw, which has a thread part and a shaft part with a recess formed at the free end for the insertion of a tool and consisting of a sleeve having an external thread, said sleeve having a radially enlarged rim portion, in which means are formed for the placement of a second tool, the sleeve being able to be pushed onto the shaft part, being rotatable on the shaft part and being held in the axial direction in such a manner that the screw and/or the sleeve can be rotated.

Such a fastening device is known from EP 0 476 466. In the known embodiment, the sleeve can be mounted onto the shaft part from the free shaft end and is held on the shaft part by means of a collar on the shaft at the one end and by means of a beaded over section of the shaft at the other hand. This type of fixation of the sleeve on the shaft part by means of beading over the free shaft end in a cold process requires a certain steel alloy, which cannot be hardened. The known screw can thus not have a hardened thread with a cutting function and can thus not be used for a direct installation in hard materials, such as concrete, brick and metal.

The invention is intended to provide a solution for this problem. The invention is based on the object of providing a fastening device, which can be screwed directly into concrete, brick, steel or the like.

A first solution of this problem lies in a fastening device of the initially named kind which is characterized in that the screw is formed by means of a rod-shaped screw blank made of steel, which can be hardened and which has a radially enlarged head section formed at the free end of the shaft part, in that the sleeve can be mounted onto the screw blank from the other end and has in its rim portion a seat, which can be placed against a head section of the shaft part, in that the shaft part (3; 23) is designed with a support section, which is enlarged towards the end of the mounted sleeve located opposite the rim portion by deformation of the screw blank so as to hold the sleeve on the shaft part and in that the screw is specified for hardening with the mounted sleeve.

A second solution of this problem lies in a fastening device, which is characterized in that the screw is made of hardened steel, in that the shaft part has a ring-shaped groove, in that the sleeve, at the end located opposite the rim portion, has an inwardly directed ring-shaped projection, which engages with the groove so as to hold the sleeve on the shaft part.

Further developments and/or advantageous embodiments of the fastening device and of the method of manufacturing the same are the subject of the further claims 2 to 12.

The invention will be explained in the following with reference to the accompanying drawings, in which:

FIG. 3 shows a longitudinal section of a third embodiment of the fastening device;

FIG. 4 shows a longitudinal section of a fourth embodiment of the fastening device;

Figure 1:
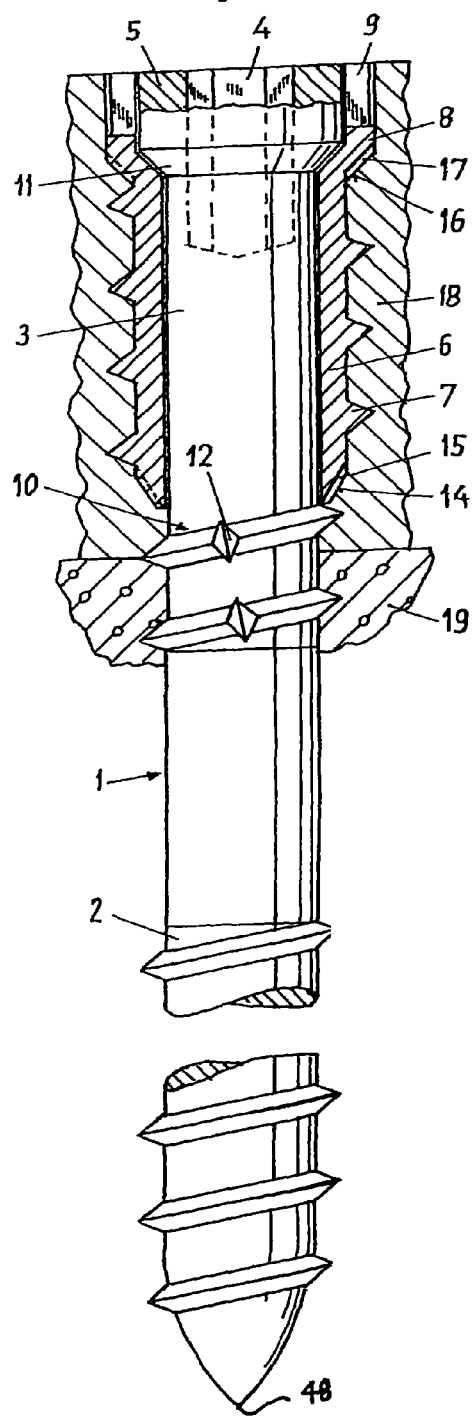
FIG. 1 shows a longitudinal section of a first embodiment of the fastening device.
Figure 2:
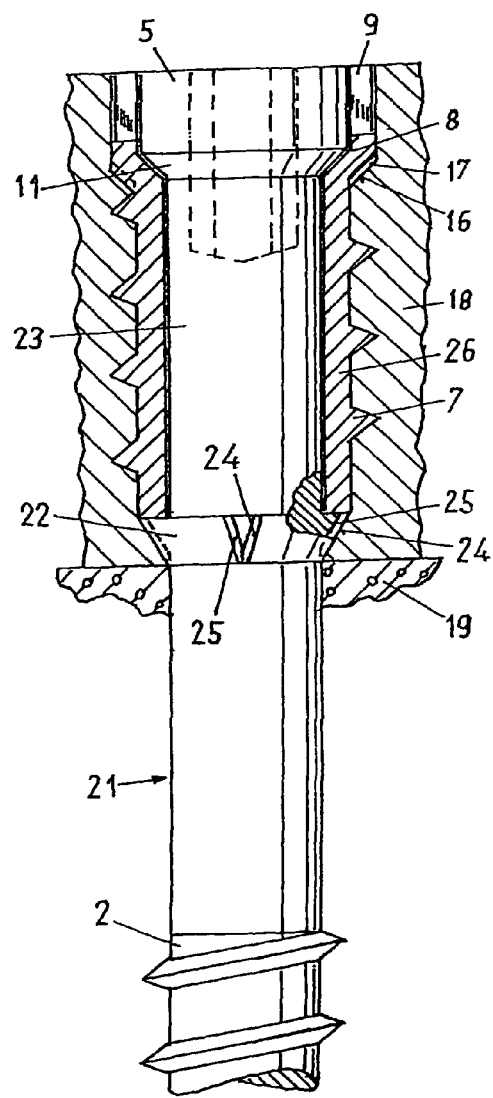
FIG. 2 shows a longitudinal section of a second embodiment of the fastening device.
Figure 5:
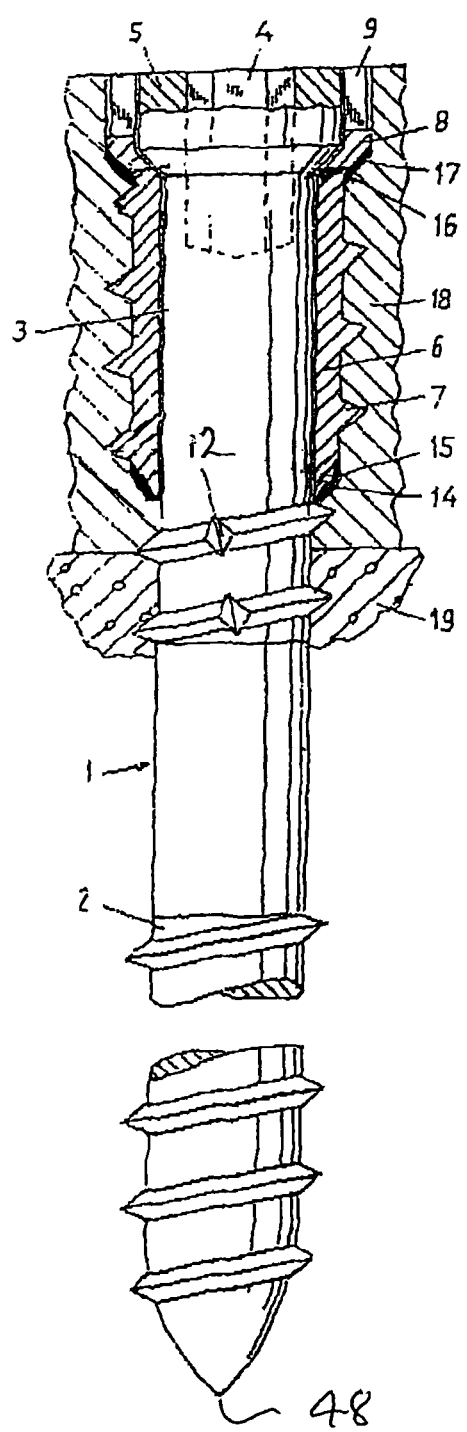
Figure 6:
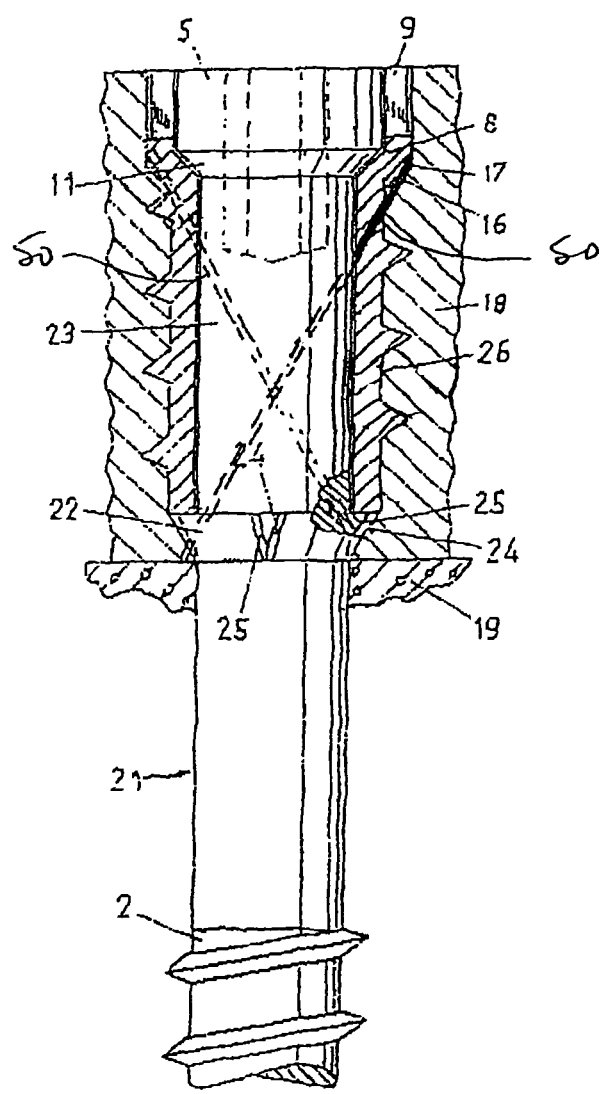

FIG. 5 a diagram similar to FIG. 1 but showing an alternative design of the pre-cutting edges and FIG. 6 a diagram similar to FIG. 2 but showing an alternative design of the precutting edges.

Figure 7:
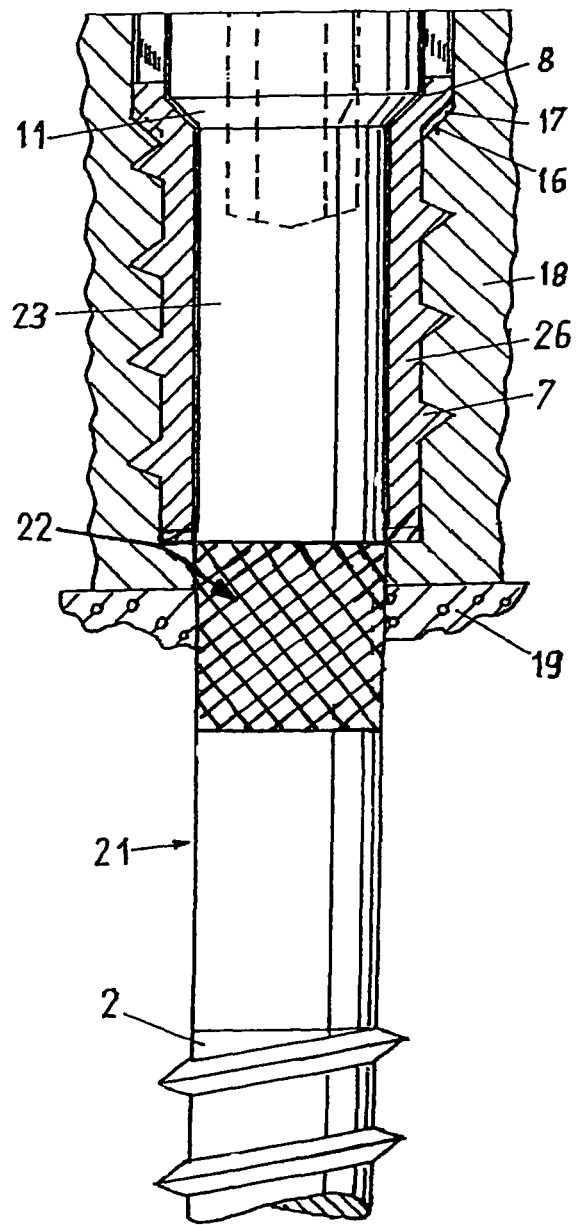

FIG. 7 a diagram similar to FIG. 2 but showing an alternative design of the support section.

The embodiment illustrated in FIG. 1 consists of a screw 1 having a thread part 2 and a shaft part 3, which has a recess 4 at the free end for inserting a non-illustrated tool and also has a sleeve 6, which is arranged on the shaft part. As illustrated, the recess 4 can be formed as an internal hexagon or as torx recess or cross-shaped slot.

The sleeve 6 has an external thread 7, the pitch of which is the same as that of the thread part 2 of the screw 1 and has at one end a radially enlarged rim portion 8 provided with slots 9, for engagement by a non-illustrated second tool. According to the illustration, the rim portion 8 can have a diameter, which substantially corresponds to the diameter of the external thread 7 of the sleeve 6.

The screw 1 is made of steel, which can be hardened and is formed by a rod-shaped cylindrical screw blank, the diameter of which substantially corresponds to the core diameter of the thread, which is to be generated at the thread part 2 and which is designed with a radially enlarged head section 5 formed at the free end of the shaft part 3 remote from the tip 48 of the screw 1. A conical support surface 11 for the sleeve 6 is formed at the head section 5. The sleeve 6 can be mounted onto the shaft part 3 over the still unprocessed thread part 2 from the other end of the screw blank. The rim portion 8 of the sleeve is designed with a conical step, which receives the head section 5 of the shaft part and which can be placed onto the support surface 11. The sleeve 6 can be made of steel, which cannot be hardened, or is not intended to be hardened, as is assumed in the illustrated example.

The shaft part 3 is designed with a support section 10, which can be generated by means of deforming the screw blank and which is enlarged towards the end of the mounted sleeve 6 adjacent the thread part 2 so as to hold the sleeve 6 on the shaft part 3. In accordance with the illustration, the support section 10 is formed by means of at least one thread turn generated at the screw blank. At least two scraper grooves 12, which are associated with the sleeve 6, can be provided at the thread turn. In the illustrated example, three scraper grooves 12, which are offset from one another in the peripheral direction, are present.

At the end of the sleeve 6, which is located opposite the rim portion 8 at least two first precutting edges 14, in the illustrated example four precutting edges 14 are provided, which are directed towards the support section 10 and which are each formed at a cut-out 15. More specifically, the first precutting edges 14 lie on the surface of a cone in axial planes containing the longitudinal axis of the screw 1. Alternatively they could be generally helically disposed on or skewed relative to the surface of said cone.

The sleeve 6 is furthermore provided with at least two second precutting edges 16, in the illustrated example four precutting edges 16, which face the external thread 7 and each of which is formed at a cut-out 17 on the conical wall section of the rim portion 8. The second precutting edges 16 are designed to cut a hole in the attachment part 18 to receive the enlarged rim portion of the sleeve 6. The hole has a diameter generally corresponding to that of the enlarged core diameter of the sleeve 6. The second precutting edges 16 preferably lie on the surface of a cone in axial planes containing the longitudinal axis of the screw 1 or are, alternatively, generally helically disposed on or skewed relative to the surface of said cone.

When such a helical or skewed position is selected the front or leading ends of the first or second precutting edges, i.e. the ends nearest the tip of the thread part 2, are preferably advanced in the direction of the thread, when moving along the thread to the tip 48 of the screw, relative to the rear or trailing ends, i.e. the ends closest to the end of the fastening device engaged by the first or second tool. This preferred orientation applies to all precutting or cutting edges in all embodiments of the fastening device. The support section 10 of the shaft part 3 equipped with the sleeve 6 and the thread of the thread part 2 can be generated at the screw blank in each case in a separate rolling process or, as assumed in the illustrated embodiment, in a common rolling process. In a subsequent operation, the screw 1 produced in such a manner and equipped with the sleeve 6 is hardened. In a further operation, the screw 1 can be provided with a galvanic coating as corrosion protection at least in the region of the thread part 2 and, if required, in the region of the support part 10.

As is illustrated in FIG. 1, the sleeve 6 is rotatably held on the shaft part 3, on the one hand by means of the support surface 11 of the shaft part 3 and, on the other hand by means of the support section 10 and is held in the axial direction in such a manner that the screw 1 and the sleeve 6 can be rotated together or individually by means of the two associated tools.

The described fastening device has the purpose of being screwed directly, i.e. without the use of a dowel, into concrete, brick, steel or the like. The illustrated embodiment serves the purpose of fastening a partially illustrated attachment part 18, which is made of wood, to a support part 19, which is made of concrete and which is also illustrated partially. The screw 1, which is equipped with the sleeve 6, is screwed in this arrangement into a bore, which is introduced into the support part 19 through the attachment part 18. The diameter of the bore corresponds to the core diameter of the thread part 2. When the support section 10 of the shaft part 3 strikes against the outside of the attachment part 18, the section of the hole penetrating the attachment part 18 is enlarged in response to the joint further rotation of the screw 1 and of the sleeve 6 by means of the scraper grooves 12 formed at the support section 10 and by means of the first precutting edges 14 formed at the end of the sleeve 6, in each case to a diameter, which corresponds to the core diameter of the external thread 7 of the sleeve 6 and which thus makes it possible to screw the sleeve 6 into the attachment part 18 in an easier manner. When the rim portion 8 of the sleeve 6 strikes against the outside of the attachment part 18, the bore formed by means of the first precutting edges 14 is enlarged in response to the further rotation of the screw 1 and of the sleeve 6 by means of the second cutting edges 17 formed at the sleeve 6, in each case to a diameter, which corresponds to the diameter of the rim portion 8 and which thus makes it possible to mount the fastening device so as to be flush with the outside of the attachment part 18.

Generally speaking a preferred method of manufacturing the fastening device of FIG. 1, which can also be used to manufacture the fastening device of FIG. 2, is as follows:

A generally rod-shaped blank is used for a screw such as is shown in FIG. 1 (or FIG. 2) which has a thread part 2 and a shaft part 3 and is made of a hardenable material, preferably of a material hardenable to a level permitting direct thread forming action in at least one of prebored concrete, pre-bored brick and pre-bored steel. A head portion 5 including a tool receiving feature 4 is formed at the end of the shaft portion remote from the end of the screw blank which will later correspond to the tip of the thread part. The head portion is enlarged relative to the core diameter of said thread part 2. The pre-manufactured threaded sleeve 6 is subsequently placed over said the shaft part from the tip end of said blank, i.e. the end corresponding to the tip of the subsequent thread of said thread part 2. Thereafter a sleeve retaining portion 10 is subsequently formed on the screw part adjacent said front end of said sleeve, ie.e the end of the sleeve adjacent the aforementioned tip. The thread is subsequently or simultaneously formed on the thread part 2 and the screw 1 is then hardened.

In the further figures of the drawings, corresponding parts are provided, where appropriate, i.e. where the parts remain essentially unchanged, with the same reference numerals as used in the earlier figures and the same description will be understood to apply, unless something is stated to the contrary.

The embodiment illustrated in FIG. 2 differs from the embodiment according to FIG. 1 by a screw 21 having a modified shaft part 23 and by a modified sleeve 26. The shaft part 23 is designed with a support section 22, which can be created by means of deforming the screw blank and which is conically enlarged towards the end of a mounted sleeve 26 opposite the rim portion 8. The support section 22 extends substantially towards the core diameter of the external thread 7 of the sleeve 26 so as to hold the sleeve 26 on the shaft part 23. On the shaft part 23 there are provided at least two first precutting edges 24, according to the illustration four precutting edges 24, which are associated with the sleeve 26, which are adjacent the thread part 2 and which in each case are formed at a cut-out 25 of the support section 22.

The support section 22 of the shaft part 23 equipped with the sleeve 26 and the thread of the thread part 2 can be generated at the screw blank in each case in a separate rolling process or, as provided in the illustrated embodiment, in a common rolling process. In a subsequent operation, the screw 21 with the mounted sleeve 26 produced in such a manner is hardened. In a further operation, the screw 21 can be provided with a galvanic coating as corrosion protection at least in the region of the thread part 2 and, if required, of the support section 22.

When the support section 22 of the shaft part 23 strikes against the outside of the attachment part 18, when the screw 21 is screwed into the hole provided in the attachment part 18 and in the support part 19, the section of the hole which penetrates the attachment part 18 is enlarged in response to a joint further rotation of the screw 21 and of the sleeve 26 by means of the first cutting edges 24 formed on the support section 22 in each case to a diameter, which corresponds to the core diameter of the external thread 7 of the sleeve 26 and which thus makes it possible to screw the sleeve 26 into the attachment part 18 in a facilitated manner.

An embodiment is also possible, in which the screw 21 is equipped with a sleeve 6 according to FIG. 1.

The embodiment illustrated in FIG. 3 consists of a screw 31 comprising a thread part 32 and a shaft part 33, which has the recess 4 for the placement of a first tool as well as a ring-shaped groove 35. The fastening device consists also of a sleeve 36, which can be mounted onto the shaft part 33 from the free end of the shaft remote from the tip of the threaded part 32. The sleeve 36 has an external thread 7, the pitch of which is the same as that of the thread part 32 of the screw 31, a radially enlarged rim portion 38 at one end and an inwardly directed ring-shaped projection 30 at the other end, which can be introduced into the groove 35 of the shaft part 33, e.g. by a rolling operation. The rim portion 38 is provided with slots 39 for the placement of a second tool and, in accordance with the illustration, has a diameter, which substantially corresponds to the diameter of the external thread 7 of the sleeve 36. At least two precutting edges 37, in the illustrated example four precutting edges 37, are provided adjacent the external thread 7 of the sleeve 36 at the enlarged rim portion 38. Each of the precutting edges 37 is formed at one of the slots 39.

The screw 31 is made of hardened steel. In accordance with the illustration, the thread part 32 can have a diameter, which corresponds to the diameter of the external thread 7 of the sleeve 36. The free end of the shaft part 33 at the end remote from the tip of the thread part 32 is designed with a conically tapering support surface 34 for the sleeve 36. The inner surface of the sleeve 36 is realised with a corresponding conical projection, which can be placed onto the support surface 34. The sleeve 36 can be made of unhardened steel.

As is shown in FIG. 3, the sleeve 36 is held by means of the support surface 34 of the shaft part 33 on the one hand and by means of the ring-like projection 30 engaging into the groove 35 on the other hand, so that the sleeve is rotatable on the shaft part 33 but fixed in the axial direction in such a manner that the screw 31 and the sleeve 36 can be rotated together or individually by means of the tools respectively associated with the recess 4 and the slots 39.

Actually the conical end surface 34 of the shaft part 33 and the complementary mating conical surface of the sleeve 36 can be omitted since the ring-like radially inwardly directed projection 30, which can be formed by a rolling operation and which engages into the groove 35 can serve to both axially fix the sleeve 36 to the screw 31 and to permit relative rotation of the sleeve 36 relative to the screw 31.

In this embodiment, the screw 31, which is equipped with the sleeve 36, is screwed into a bore, which is introduced into the support part 19 through the attachment part 18. The diameter of the bore corresponds to the core diameter of the thread part 32 and of the external thread 7 of the sleeve 36, respectively.

The embodiment illustrated in FIG. 4 differs from the embodiment according to FIG. 3 in a screw 41 with a shaft part 43, which has a radially enlarged end portion 44 (radially enlarged with respect to the outer diameter of the thread part 42 of the screw 41) bounding the groove 35, with the diameter of the end portion substantially corresponding to the core diameter of the external thread 7 of the sleeve 36. The thread part 42 adjoins the end section 44 and has a smaller diameter than the end section 44. At least two first precutting edges 45 facing the thread part 42 are provided on the shaft part 43, each of which is formed at a cut-out 46 axially directed in the end portion 44. The screw 41 also consists of hardened steel. The thread part 42 is designed with a pitch, which is the same as the pitch of the external thread 7 of the sleeve 36.

In this embodiment, the screw 41, which is equipped with the sleeve 36, is screwed into a bore, which is inserted into the support part 19 through the attachment part 18. The diameter of the hole corresponds to the core diameter of the thread part 42. When the end portion 44 of the shaft part 43 strikes against the outside of the attachment part 18, the section of the bore passing through the attachment part 18 is enlarged in response to the further rotation of the screw 41 by means of the precutting edges 45 of the shaft part 43, in each case to a diameter which corresponds to the core diameter of the external thread 7 of the sleeve 36 and which thus makes it possible to screw the sleeve 36 into the attachment part 18 in a facilitated manner.

The afore-described embodiments each make it possible, in particular without using a stud, to attain a direct, stress-free installation of the fastening device in hard materials, such as concrete, brick, steel or the like in an advantageously simple manner and to thus attain a reliable and permanent connection between the attachment part 18 and the support part 19.

The fastening devices of FIGS. 3 and 4 can each be made by a method as follows:

First of all a blank for a screw is taken which is preferably of rod shaped (cylindrical) form, the blank is made of a hardenable material, preferably of a material hardenable to a level permitting direct thread forming action in at least one of prebored concrete, pre-bored brick and pre-bored steel.

A head portion including a tool receiving feature 4 is then formed on said blank, e.g. by a cold heading process, and the groove 35 is formed between the thread part 32; 42 and the shaft part 33; 43 or in said shaft part.

The thread is subsequently or simultaneously formed on said thread part 32; 42, e.g. by a rolling process, and the screw 31, 41 is thereafter hardened The method comprises the further step of placing the pre-manufactured threaded sleeve 36 over said shaft part and subsequently deforming the portion 30 of said sleeve into the groove 35. This sleeve placement step can take place before or after forming a thread on said thread part 32;42 and before or after hardening of the screw 31; 41.

Turning now to FIG. 5 there can be seen a modified version of the fastening device of FIG. 1 in which the first and second precutting edges 14 and 16 are helically disposed rather than lying in axial planes as shown in FIG. 1. That is to say FIG. 5 shows the helical or skewed position of the first and second precutting edges 14 and 16 referred to above as an alternative in connection with FIG. 1 and also the corresponding helical or skewed position of the grooves 15 and 17 defining the precutting edges at the intersections of the respective grooves at the surface of the sleeve 6.

FIG. 6 shows a modified version of the fastening device of FIG. 2 in which the external thread 7 of said sleeve 26 has helically or axially extending grooves 50 extending over a major portion of the axial length of the sleeve between a front end thereof adjacent a tip of said thread part 2 and the enlarged rim portion thereof. Indeed the grooves 50 can essentially form axial extensions of the first precutting edges 24 and run out into second precutting edges 16. A similar arrangement of axially or helically extending grooves 50 can also be provided in the embodiment of FIG. 5 and also in the embodiments of FIGS. 3 and 4.

Thus the second precutting edges 17 can be provided at a front portion of said enlarged rim of said sleeve 6; 26 and can be generally formed by extensions of the helically or axially extending grooves 50 and, optionally, the helically or axially extending grooves 50 of the thread part 7 of said sleeve 6; 26 can be aligned with and form continuations of the first precutting edges 14; 24 formed on said sleeve 6 adjacent said support section 10 or on said support section 22. The grooves 50 thus form continuous cutting edges at their intersections with the surface of the sleeve 6; 26. The grooves 50 also function to ensure the waste material cut from the installation part 18 is led away better. The grooves 50 can in particular be formed in the manner described in EP-B-0870118 of the present applicant.

More specifically the grooves or notches 50 are formed in the threads 7 of the sleeve 6: 26 and lie generally on a straight line which extends at a preferred angle of about 15° relative to the longitudinal axis of the screw 1; 21. If the precutting edges 14; 24 or 16 are inclined helically then they are also preferably inclined at the same angle. Four grooves or rows of notches are preferably provided and are uniformly distributed around the periphery of the sleeve with the same alignment at the periphery of the sleeve. If the grooves only intersect the threads 7 of the sleeve then they can be thought of as discrete notches, they can however be made deeper than the core diameter of the thread 7 and then form continuous grooves.

If the grooves are designed so that discrete notches are formed then these are generally triangular and have an apex (deepest point) at the core diameter of the thread 7 with the one side surface extending radially and the other generally tangentially.

The notches also form cutting edges which in a particularly advantageous manner facilitate the entry of the sleeve 6; 26 into the attachment part.

FIG. 7 shows a further embodiment of the fastening device. Support section 22 of the shaft part 23 of this embodiment is formed by knurling/engrailing, particularly cross-knurling. The knurling operation is performed after sleeve 26 has been placed over shaft part 23 of the fastening device. This operation leads to an increase of the diameter of the knurled section thereby preventing that sleeve 26 can slip off the shaft part 23. After forming the cross-knurled support section 22, the fastening device can be exposed to a hardening process to harden the materials of the device.

The knurled character of support section 22 has also a rasping/precutting effect when the fastening device is screwed in support part 19.

It should be mentioned that all described fastening devices are suitable for anchorage in any massive base or material as concrete, brick, metal, in particular steel, or the like. Wood and plastic are also massive materials in that sense. The attachment part can also be made of any material, particularly of any of the materials mentioned above.

The invention claimed is:

1. A fastening device for anchorage in a base material to secure an attachment part to the base material, the fastening device consisting of:
    a combination of a screw and a sleeve,
    the screw formed using a screw blank made of steel and having a shaft extending in an axial direction between a first and second end,
    the screw including a thread extending along part of the shaft from the first end,
    the screw including a head at the second end and a recess formed at the head for the insertion of a tool,
    the sleeve mounted on the shaft of the screw and including a rim portion forming a seat disposed adjacent to the head of the screw,
    the sleeve including an external thread and the rim portion including means for the placement of a second tool,
    the screw including a support section disposed between the thread of the screw and the mounted sleeve and being enlarged towards a first end of the mounted sleeve located opposite the rim portion by deformation of the screw blank to hold the sleeve on the shaft in the axial direction between the head and the support section in such a manner that the screw and/or the sleeve can be rotated, and
    the screw including first cutting edges at the support section and the sleeve including second cutting edges at the rim portion;
    wherein the screw is hardened with the sleeve mounted thereon.

2. A fastening device for anchorage in massive bases or materials such as concrete, brick, steel or the like in accordance with claim 1, wherein the screw is made of hardened steel, the shaft part has a ring-shaped groove, and the sleeve at the end located opposite the rim portion has an inwardly directed ring-shaped projection, which engages with the groove so as to hold the sleeve on the shaft part.

3. The fastening device in accordance with claim 2, wherein the shaft part has a portion enlarged relative to the thread part and bounding the groove in front of the front end of the threaded sleeve adjacent the tip of the screw, the diameter of the enlarged portion corresponding to the core diameter of the external thread of the sleeve and in that the thread part of the screw has a smaller diameter than the end portion.

4. The fastening device in accordance with claim 3, wherein at least two first cutting edges are provided at the enlarged portion adjacent to the thread part and designed to cut a hole in an attachment part, the hole having a diameter generally corresponding to that of the core diameter of the external thread of the sleeve, the first cutting edges either lying in axial planes containing the longitudinal axis of the screw or being generally helically disposed on the surface of the enlarged part.

5. The fastening device in accordance with claim 1, wherein third cutting edges are provided adjacent the support section at the first end of the sleeve located opposite the rim portion.

6. The fastening device in accordance with claim 1, the sleeve having a core diameter, there being at least two of the first cutting edges provided at the support section and which are configured to cut a hole in the attachment part, the hole having a diameter generally corresponding to that of the core diameter of the external thread of the sleeve.

7. The fastening device in accordance with claim 1, wherein the sleeve has an axial length and the external thread of the sleeve has helically or axially extending grooves or notches extending over a major portion of the axial length of the sleeve between the first end thereof and the rim portion.

8. The fastening device in accordance with claim 7, wherein the second cutting edges are provided at a front portion of the rim portion of the sleeve.

9. The fastening device in accordance with claim 8, wherein the second cutting edges extend from the helically or axially extending grooves or notches formed in the external thread of the sleeve.

10. The fastening device in accordance with claim 8, wherein the helically or axially extending grooves or notches in the external thread of the sleeve are aligned with and form continuations of the first cutting edges formed on the support section.

11. The fastening device in accordance with claim 1, wherein at least two second cutting edges facing the external thread are provided at the rim portion of the sleeve and configured to cut a hole in the attachment part to receive the rim portion of the sleeve, the hole having a diameter generally corresponding to that of the rim portion, and wherein the second cutting edges either lying on a surface of a cone in axial planes containing a longitudinal axis of the screw or being generally helically disposed on or skewed relative to the surface of the cone.

12. The fastening device in accordance with claim 1, further comprising further cutting edges, any of the first, second and further cutting edges defined by radially outer extremities of respective flutes or grooves formed in the support section.

13. The fastening device in accordance with claim 1, wherein a knurled or engrailed region is provided on the shaft adjacent a front end of the sleeve to retain the sleeve on the shaft, the knurled or engrailed region having a rasping or cutting effect.

14. The fastening device in accordance with claim 1, wherein the shaft of the screw is made of a material hardened to a level permitting direct thread forming action in at least one of pre-bored concrete, pre-bored brick and pre-bored steel.

15. A fastening device for anchorage in a base material to secure an attachment part to the base material, the fastening device comprising:
- a screw having a thread part and a shaft part, an enlarged head section is formed at a free end of the shaft part and includes a recess adapted for insertion of a first tool, an outer support surface is associated with the head section;
- a tubular sleeve rotatably mounted on the shaft part of the screw and having a threaded portion and an enlarged rim portion formed with a slot adapted for insertion of a second tool, the rim portion having a wall section connected to a first end of the threaded portion which defines a seat;
- the screw including an enlarged support section formed on the shaft part adjacent to the thread part and disposed in engaging relationship with a second end of the threaded portion of the sleeve to axially locate the sleeve on the screw between the support section and the head section while permitting relative rotation therebetween; and
- the support section of the screw including first cutting edges and the wall section of the rim portion of the sleeve including second cutting edges;
- wherein the screw is hardened with the sleeve mounted thereon.

16. The fastening device of claim 15 wherein an external thread formed on the threaded portion of the sleeve has a pitch that is equal to that of an external screw thread formed on the thread part of the screw, and wherein the rim portion of the sleeve has a diameter that is equal to the diameter of the external thread on the threaded portion of the sleeve.

17. The fastening device of claim 15 wherein the screw is made using a screw blank made of steel, and wherein the support section on the shaft part is formed by deformation of the screw blank.

18. The fastening device of claim 17 wherein the support section of the shaft part is conically-shaped toward the second end of the threaded portion of the sleeve, and wherein the first cutting edges are formed as cut-outs on the conically-shaped support section.

19. The fastening device of claim 15 wherein the threaded portion of the sleeve has a core diameter, and wherein the first cutting edges on the support section are configured to cut a hole in the attachment part with the hole having a diameter generally corresponding to the core diameter of the threaded portion of the sleeve.

20. The fastening device of claim 15 wherein the threaded portion of the sleeve has an axial length, and wherein an external thread is formed on the threaded portion and includes helically or axially extending grooves or notches extending over a major portion of the axial length of the threaded portion.

21. The fastening device of claim 20 wherein the second cutting edges formed on the rim portion of the sleeve face the external thread on the threaded portion of the sleeve extend from the helically or axially extending grooves or notches formed in the external thread of the sleeve.

22. The fastening device of claim 15 wherein third cutting edges are formed in the second end of the threaded portion of the sleeve and which are located adjacent to the first cutting edges formed on the support section of the screw.

23. A fastening device for anchorage in a base material to secure an attachment part to the base material, the fastening device comprising:
- a screw made from a steel screw blank and having a thread part and a shaft part;
- the screw including a head portion formed at a free end of the shaft part and defining a first recess configured for insertion of a first tool therein;
- a sleeve adapted to be mounted on the shaft part of the screw and having an externally threaded portion and a rim portion and a second recess formed in a free end of the rim portion configured for insertion of a second tool therein;
- the screw including a support section disposed between the thread part and the shaft part and formed by deformation of the steel screw blank;
- the rim portion of the sleeve defining a seat such that when the sleeve is pushed onto the shaft part of the screw the head portion is positioned adjacent to the seat and an end of the threaded portion is positioned adjacent to the support section so as to permit relative rotation between the screw and the sleeve while axially locating the sleeve with respect to the shaft part of the screw; and
- the support section of the screw including first cutting edges formed thereon and the rim portion of the sleeve including second cutting edges formed thereon;
- wherein the screw is hardened with the sleeve mounted thereon.

* * * * *